United States Patent Office 2,988,567
Patented June 13, 1961

2,988,567
BORON TRIALKANOLAMINE DERIVATIVES
George M. Omietanski, Tonawanda, N.Y., assignor, by mesne assignments, to Ohio State University Research Foundation, Columbus, Ohio, a corporation of Ohio
No Drawing. Original application June 24, 1958, Ser. No. 744,085. Divided and this application Aug. 3, 1959, Ser. No. 831,434
3 Claims. (Cl. 260—462)

This invention relates to quaternary nitrogenous salts. In one specific aspect, it relates to quaternized derivatives of substituted hydrazines. In still another aspect, it relates to novel boron tris(oxyalkyl)- and poly(oxyalkyl)-hydrazinium salts.

Heretofore, quaternary hydrazinium salts have been obtained only on a laboratory scale. They have been prepared by the reaction of unsymmetrical dialkylhydrazines with alkylating agents, frequently lower alkyl halides. Because of the difficulties involved in preparing the parent hydrazines, the uses of hydrazinium compounds have not yet been completely exploited. The present invention relates to a new class of heretofore unavailable hydrazinium compounds prepared by new synthetic methods capable of adaption to commercial production. This application is a division of my copending application Serial No. 744,085, filed June 24, 1958 which in turn is a continuation-in-part of my application Serial No. 582,657, filed May 4, 1956 and now abandoned.

It is, therefore, an object of the present invention to provide a new generic class of boron tris(oxyalkyl)- and poly(oxyalkyl)hydrazinium compounds which, because of their unique structure and properties are useful intermediates for the synthesis of surfactant hydrazinium esters and the preparation of polymers which will not build-up electrostatic charges. These compounds are useful as cross-linking or curing agents for certain classes of polymers, the most important of which are the epoxy resins.

In accordance with the present invention I have made available a new generic class of useful hydrazinium compounds which may be represented as having the general formula:

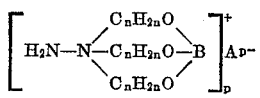

In the above formula $(C_nH_{2n}O)$, $(C_nH_{2n}O)$ and $(C_nH_{2n}O)$ represent alkoxy groups with $n$ being 2 or 3. The charge on the anion A (chloride of sulfate) is $p$ which also represents the number of cations required to maintain the electric neutrality of the salt.

The specific trialkanolamine derivatives of my invention can be prepared by several general methods and this discussion is not meant to be all inclusive. The preferred approach used here was the reaction of chloramine with suitable tertiary amines in accordance with the recent discovery that their reaction leads to the formation of 1,1,1-trisubstituted hydrazinium chlorides. Chloramine is readily available from the vapor phase reaction of chlorine and excess ammonia according to the process of Sisler et al., described in U.S. Patent No. 2,710,248. By treating that particular class of tertiary amines having a structure which is embraced by the general formula supra with chloramine, I am able to prepare the chloride salts of my novel hydrazinium compounds. In making the chloride compounds of the present invention, it is usually desirable to contact chloramine with a solution of the selected tertiary amine, allow the reaction to proceed until the desired quantity of chloramine is consumed and then isolate and purify the resultant hydrazinum chloride by standard laboratory techniques. An excess of tertiary amine may be used in lieu of the inert solvent. While chloramine is most advantageously prepared in the form of a gaseous chloramine-ammonia stream obtained from a generator constructed according to the teachings of Sisler et al., other methods are equally adaptable for the purposes of the present invention. For instance, chloramine can be made by reacting chlorine with an excess of ammonia in a halogenated hydrocarbon solvent under controlled conditions of mixing at low temperatures. Such a procedure is fully described in U.S. Patent No. 2,678,258 to John F. Haller. Another effective procedure is that of Coleman et al., described in detail in Inorganic Syntheses, vol. I, 59 (1939). Alternately the chloride components of the present invention can be made directly by the procedure described in the co-pending application of Bernard Rudner, Serial No. 605,230, filed August 20, 1956, which teaches the reaction of chlorine, ammonia and the tertiary amine in the presence of excess ammonia. For simplicity, when both the amine and the product are soluble in the same inert solvent, the Rudner method has been found to be a preferred technique.

As disclosed in my co-pending application Serial No. 696,949, filed November 18, 1957, hydroxylamine-o-sulfonic acid reacts with tertiary amines to form 1,1,1-trisubstituted hydrazinium sulfates. That approach has been utilized to prepare the novel sulfate salts of this invention. Preferably the appropriate tertiary amine and hydroxylamine-o-sulfonic acid are allowed to react or are heated together in the presence of an alcoholic solvent but excess amine or other suitable solvents may be used. Even though the use of solvent is not required, superior results are obtained with a solvent because of the extremely exothermic reaction that quite often results. A frequent purification step is the treatment of the reaction mixture with a basic substance such as sodium carbonate to remove acidic constituents from the product hydrazinium sulfate which is essentially neutral and stable to the action of base. Further purification is effected by standard laboratory techniques. Because of the multiplicity of ether and hydroxyl groups present in the molecule, the compounds of my invention, especially the sulfate salts, are quite often extremely hygroscopic and require careful drying in vacuo.

Amines suitable for the practice of my invention can be considered as and are in fact derivatives of ammonia. Treatment of ammonia with ethylene oxide gives triethanolamine; further reaction with ethylene oxide gives mixtures of higher oxyalkylated products. Propylene oxide and ammonia react in a similar fashion to give triisopropanolamine, etc. Customarily, oxyalkylation is done to a fixed epoxide-amine molar ratio. But oxiranes are highly reactive and the reaction cannot be controlled to give the desired product exclusively. What actually results is a complex mixture of the moiety 1,1,1-tris-(2-hydroxypolyalkoxyalkyl)amine containing the average number of moles of alkylene oxide per mole of amine (ammonia). Such mixtures are not commercially resolvable but are sold on the basis of the number of moles of alkylene oxide absorbed. The terminal hydroxyl groups of my novel compounds are reactive and can enter into conventional polymer formulations. Resins based on long chain oxyalkylated constituents are desirable in the art because of cheapness of cost, resistance to hydrolysis of the ether group and flexibility of the resin because of internal plasticization by the long chains present. As is well known, synthetic textiles, fibers, etc. normally have a great tendency to develop undesirable electrostatic charges. Because of the positive charge on the hydrazinium group, polymers containing my novel compounds will not have the usual tendency to develop static electrical charges.

Triethanolamine and triisopropanolamine form borate esters of the type $N[-CH_2CH(CH_3)O-]_3B$ which undergo reaction with chloramine and hydroxylamine-o-sulfonic acid to give the corresponding hydrazinium chloride and sulfate respectively. Triethanolamine titanate and triisopropanolamine titanate behave in a similar manner. In addition, the hydrazinium spirotitanates may be prepared by the reaction of titanium tetrachloride with 1,1,1-tris-(2-hydroxyethyl)- or 1,1,1-tris-(2-hydroxypropyl)hydrazinium chloride. My novel titanium and boron metaloid chelates, like the other compounds of my invention, are useful in polymer technology. Their special merit consists in their ability to cure epoxide resins at mild conditions. Combination of the hydroxyl groups in a metaloid chelate catalytically activates my novel compounds for reaction with epoxide groups particularly as well as with other condensation-capable groups.

The scope and utility of my invention is further illustrated by the following examples.

*Example I*

By the process described in U.S. Patent No. 2,710,248 of Sisler et al., chloramine (or monochloramine) is prepared by the vapor phase reaction of chlorine and ammonia. A generator was constructed to prepare gaseous mixtures of chloramine, ammonia and nitrogen using this process.

Such a gaseous chloramine-ammonia-nitrogen mixture was bubbled into a solution of 20 ml. (21.8 g.) of commercial triethanolamine in 50 ml. of xylene for 68 minutes. Use of a cold water bath was necessary to hold the reaction temperature below 45° C. Chloramine uptake was rapid and approximately 90% complete; all of the chloramine in the reaction flask was consumed within five minutes after the gas flow had been stopped. The white oil that precipitated during the reaction was separated by decantation, washed with hexane and carbon tetrachloride and then dried in a vacuum desiccator. Heating with limited quantities of isopropyl alcohol gradually converted the oil to crystalline 1,1,1-tris-(2-hydroxyethyl)hydrazinium chloride, M.P. 178–180° C. The product was an extremely hygroscopic solid very soluble in water and ethyl alcohol and appreciably soluble in isopropyl alcohol but insoluble in hydrocarbon solvents. Aqueous solutions, when made alkaline, functioned as strong reducing media. Because of the reactivity of the terminal hydroxy groups, acyl derivatives were readily formed.

*Example II*

The gaseous chloramine mixture of Example I was passed into a solution of 200 g. of triethanolamine in 1000 ml. of chloroform. The gel-like product contained ammonium chloride and unreacted amine. Purification was accomplished by evaporating the entire reaction mixture to dryness, washing with ether, evaporating the residue after the addition of 50 ml. of 10% aqueous sodium carbonate and further washing with ether. The product was extracted by means of hot absolute alcohol. Evaporation of the solvent and drying in vacuo gave 220 g. of 1,1,1-tris-(2-hydroxyethyl)-hydrazinium chloride as a pale yellow oil containing 16.6% chloride. Even though relatively pure, the product could not be made to crystallize. It was observed that once the crystalline product of Example I was exposed to moisture, it was converted to the same non-crystallizable viscous oil.

*Example III*

Equimolar amounts of hydroxylamine-o-sulfonic acid (5.65 g.), triethanolamine (8 g.) and sodium hydroxide (2 g.) were allowed to react by adding the acid dissolved in methyl alcohol to a solution of the base and triethanolamine in the same solvent. After the vigorous exothermic reaction had subsided, sodium sulfate precipitated from the cooling reaction mixture and was separated by filtration. Pouring the reaction mixture into an excess of chloroform resulted in the precipitation of crude 1,1,1-tris-(2-hydroxyethyl)-hydrazinium sulfate as an oil. The product was treated with sodium carbonate, dried and extracted with ethyl alcohol. Pouring the extract into excess chloroform gave the product as a pale yellow hydroscopic oil.

*Example IV*

The addition of 5.65 g. of hydroxylamine-o-sulfonic acid to 20 g. of triethanolamine without solvent generated much heat and resulted in a gummy precipitate of product and triethanolamine sulfate. The reaction mixture was worked up as in the previous example and with the same results.

*Example V*

Chloramine as previously prepared was added to a solution of 33.7 g. of triethanolamine borate in chloroform. Filtration gave 44 g. of the combined solid product and ammonium chloride. Solution in hot isopropyl alcohol followed by the addition of ethyl acetate allowed the ammonium chloride to be removed by filtration. Evaporation of the filtrate gave the product as a semisolid residue to which the formula $$[B(OC_2H_4)_3NNH_2]^+Cl^-$$

has been ascribed.

I claim:

1. Compounds having the general formula:

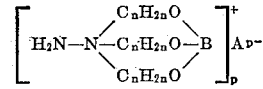

wherein $C_nH_{2n}O$ represents an alkoxy group with $n$ having the values of 2 and 3; $p$ represents the charge on A; and A is an anion selected from the group consisting of chloride and sulfate.

2. Compounds having the general formula:

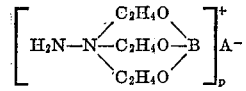

wherein $p$ represents the charge on A and A is an anion selected from the group consisting of chloride and sulfate.

3. As a new chemical compound, 1,1,1-bor-tris-(2-oxyethyl)-hydrazinium chloride.

No references cited.